United States Patent [19]
Yach

[11] Patent Number: 5,395,155
[45] Date of Patent: Mar. 7, 1995

[54] SEAT POSITION CHANGING APPARATUS FOR A BICYCLE OR CYCLE-TYPE MACHINE

[76] Inventor: Thomas L. Yach, 3048 N. Ocean Blvd., Ft. Lauderdale, Fla. 33308

[21] Appl. No.: 122,706

[22] Filed: Sep. 16, 1993

[51] Int. Cl.$^6$ ............................................. B62J 1/10
[52] U.S. Cl. ............................................. 297/215.14
[58] Field of Search .................... 297/195.1, 215.14; 248/284, 371, 421; 280/220, 288.4

[56] References Cited

U.S. PATENT DOCUMENTS 4,502,811  3/1985  Patriarca ............... 297/215.14 X
5,048,891  9/1991  Yach ......................... 297/195

FOREIGN PATENT DOCUMENTS 607186  8/1960  Italy ........................ 297/215.14

Primary Examiner—Peter R. Brown
Attorney, Agent, or Firm—Miller, Morriss & Pappas

[57] ABSTRACT

An adjustable cycle saddle seat assembly having an in situ operator controlled improved seat position changing apparatus integrally provided therein which comprises a saddle seat having rails assembly nose bumper engaging inside surfaces. A longitudinally extending rails assembly is provided within the saddle seat and has a nose pin engaging rail notch provided therein. The saddle seat is provided with a rail retainer member in .sliding engagement with the rails assembly. A rail assembly support rest member is affixed to the saddle seat and is threadably connected to the rails retainer member by use of a rail guide screw member so as to operatively slidably engage the rails assembly between the rest member and the rails retainer member. A transversely positioned saddle nose pin is fixedly provided in the saddle seat go as to selectively engage the rail notch when the saddle seat is moved to its rear position. A rails assembly nose bumper is fixedly provided in the rails assembly so as to selectively engage the nose bumper engaging inside surfaces of the saddle assembly so as to selectively center the rails assembly when the saddle seat is in its rearward position. An operator controlled actuator is provided in operative engagement with the rails assembly so as to selectively change the relative position of the saddle seat to its respective forward and rear positions on the rails assembly.

8 Claims, 6 Drawing Sheets

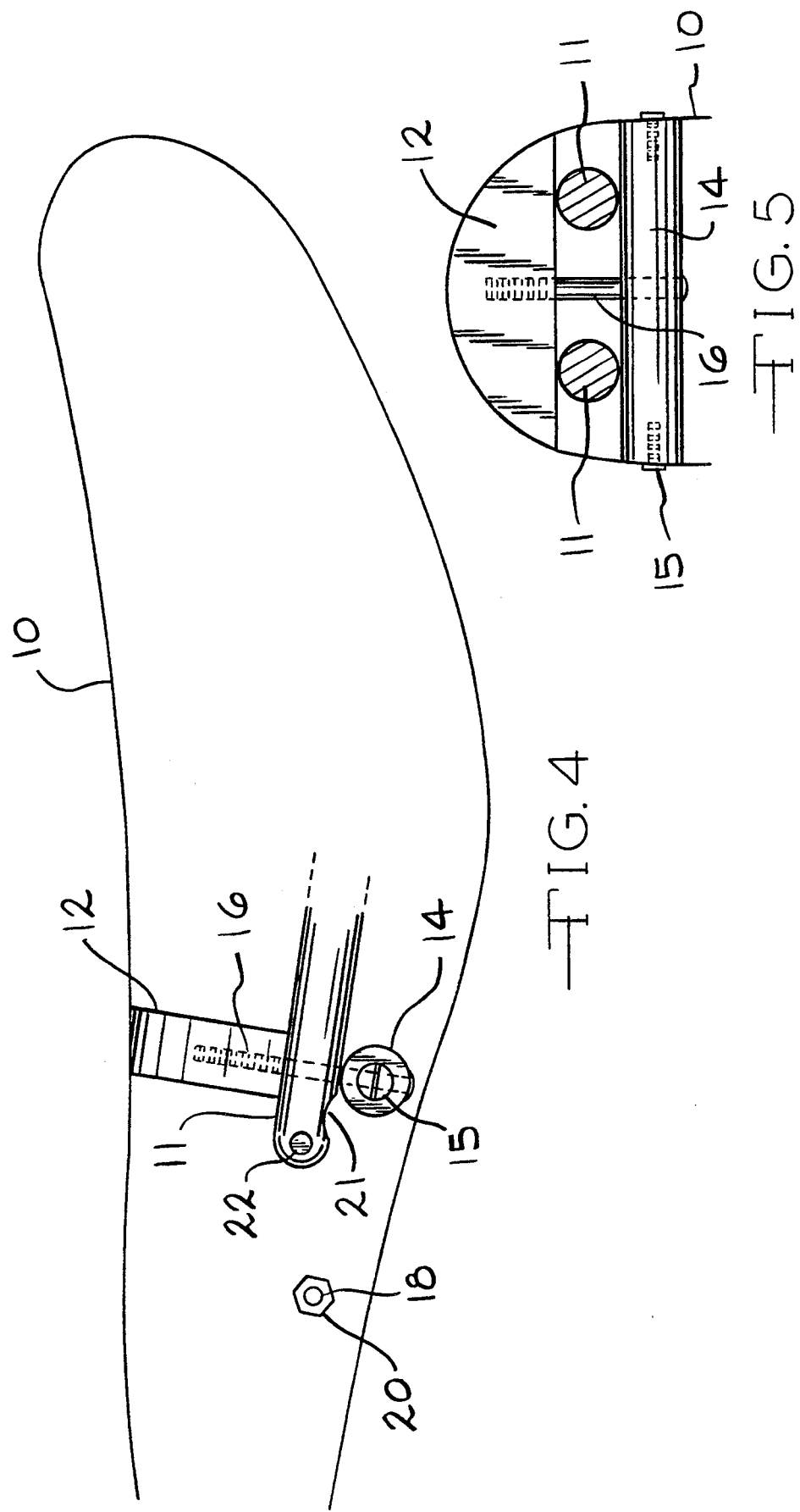

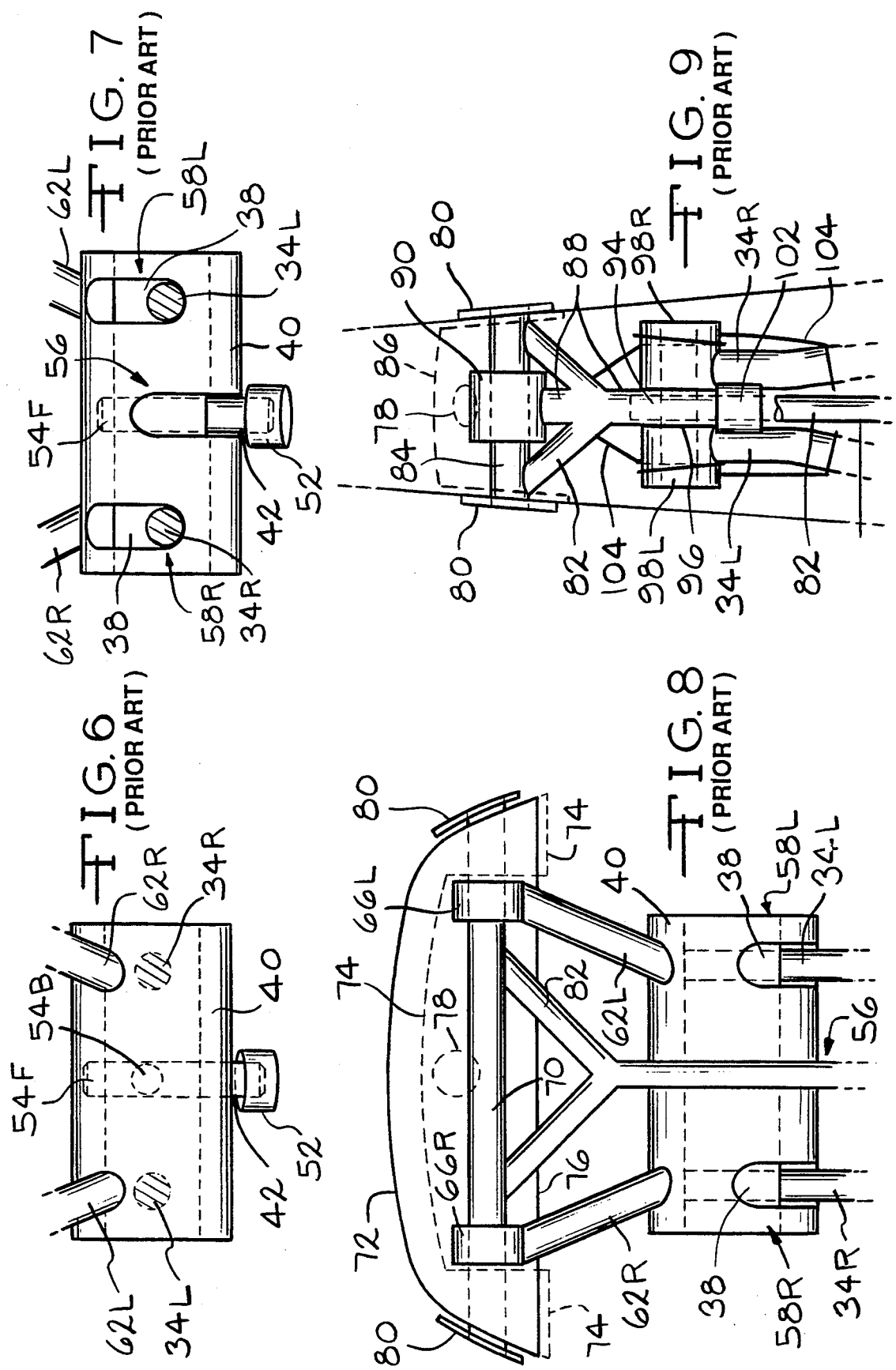

ACTUATING CONTROL 106

SEAT POSITION CHANGING APPARATUS FOR A BICYCLE OR CYCLE-TYPE MACHINE

FIELD OF INVENTION

This invention relates to an adjustable cycle saddle seat assembly adapted for selective mounting on a cycle seat support post and having an in situ operator controlled improved seat position changing apparatus integrally provided therein, controllable by a bicycle rider while riding the bicycle or an operator while operating the cycle-type machine upon which the adjustable saddle seat assembly is mounted.

PRIOR ART

The significant prior art relating to this improvement invention is the inventor's own U.S. Pat. No. 5,048,891 which was issued on Sep. 17, 1991. The actuating control and releasable locking mechanism, shown and described in the applicant's U.S. Pat. No. 5,048,891 remain the same in this improvement invention and the detailed description thereof in U.S. Pat. No. 5,048,891 are incorporated herein by reference thereto.

OBJECTS AND ADVANTAGES

This invention relates to significant improvements for the forward-saddle-portion supporting system of issued U.S. Pat. No. 5,048,891. The new and novel improvements comprise, but are not necessarily limited to: an improved saddle/rails horizontal centering system whereby construction is simplified. Tolerances are more forgiving, wear is reduced, sticking or jamming from dirt infiltration is reduced, adjustments for wear can be incorporated, strength and safety is improved, saddle movement geometry is improved and aesthetic appearance is enhanced. Also, the above attributes apply to new and novel vertical load support system improvements particularly as regards strength, reliability, safety, wear compensation provisions, and simplified construction. A prototype working field model of the embodiment depicted in the ensuing drawings and descriptions has been constructed and tested in over 1,000 miles of actual field use with excellent results consistent with the above mentioned improved desirable effects. Further objects and advantages will become apparent from a consideration of the drawings and ensuing descriptions.

DESCRIPTION OF DRAWINGS

FIG. 4 is a side elevational view with the saddle in the forward position.

FIG. 5 is a cross sectional view of FIG. 3 taken on line 5—5.

FIGS. 6 through 9 are rear end views of the prior art releasable locking mechanisms and associated structures utilized with this improvement invention as shown and described in U.S. Pat. No. 5,048,891.

DESCRIPTION OF THE INVENTION

Structural Description of improvement invention preferred embodiment as shown in FIGS. 1-5 of the drawings. The prior art actuating structures used in association with the improvement invention are shown in FIG. 3 and FIGS. 6 through 10.

Figure 1:
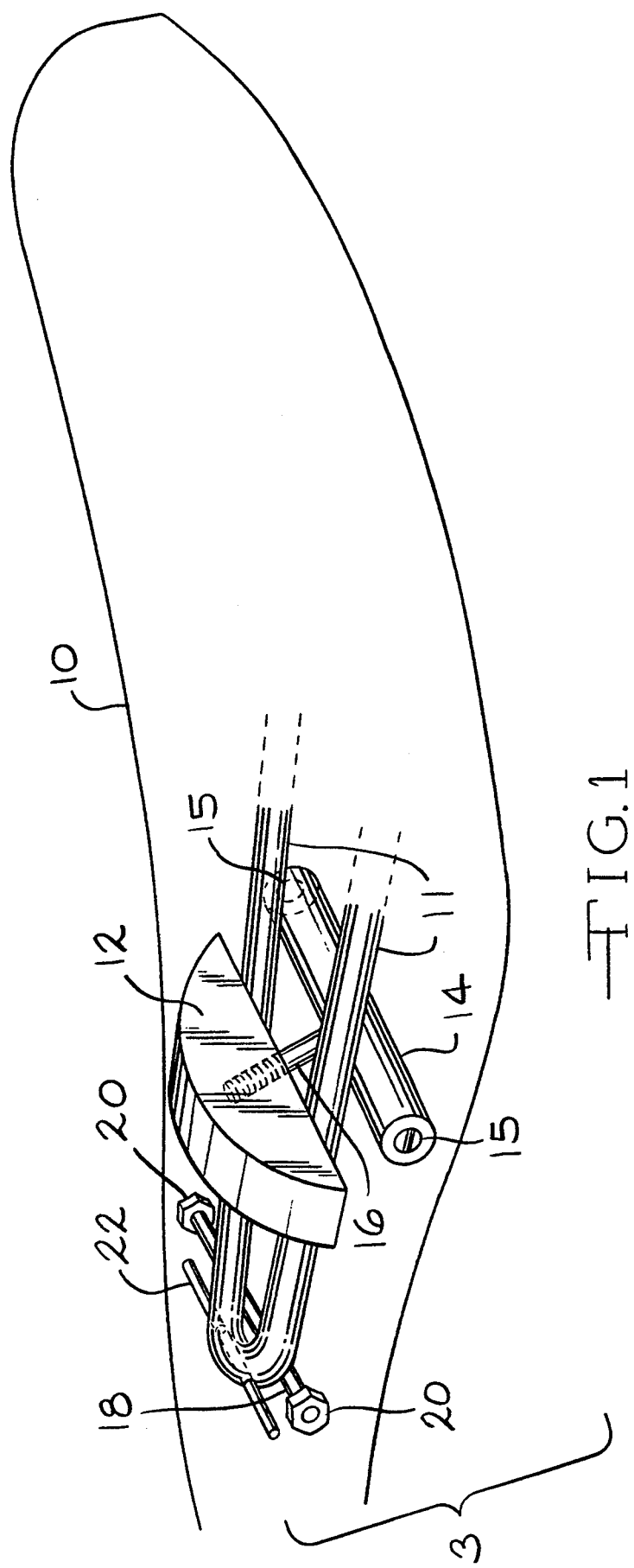
FIG. 1 is a perspective view of all the components with the saddle in the rear position.

FIG. 1 shows a saddle 10 with a rails rest 12 either integrally molded with the saddle 10 or independently affixed to the saddle 10 by adhesive, screws, or other suitable means. The rails rest 12 rests on the rails 11, beneath which rails 11 is affixed, to either side of the saddle 10 with screws, adhesive, or other suitable means, a rails retainer 14. A hole is bored through the rails retainer 14 at its approximate center in an axis line, pointing at the approximate center of the rails rest 12, to permit slipfit of a rails guide screw 16, which rails guide screw 16 is threadably received by the rails rest 12. A saddle nose pin 18 is affixed transverse to the longitudinal axis of the saddle 10 to come to bear against the rails notch 21 when the saddle 10 is in its rearward position.

Figure 2:
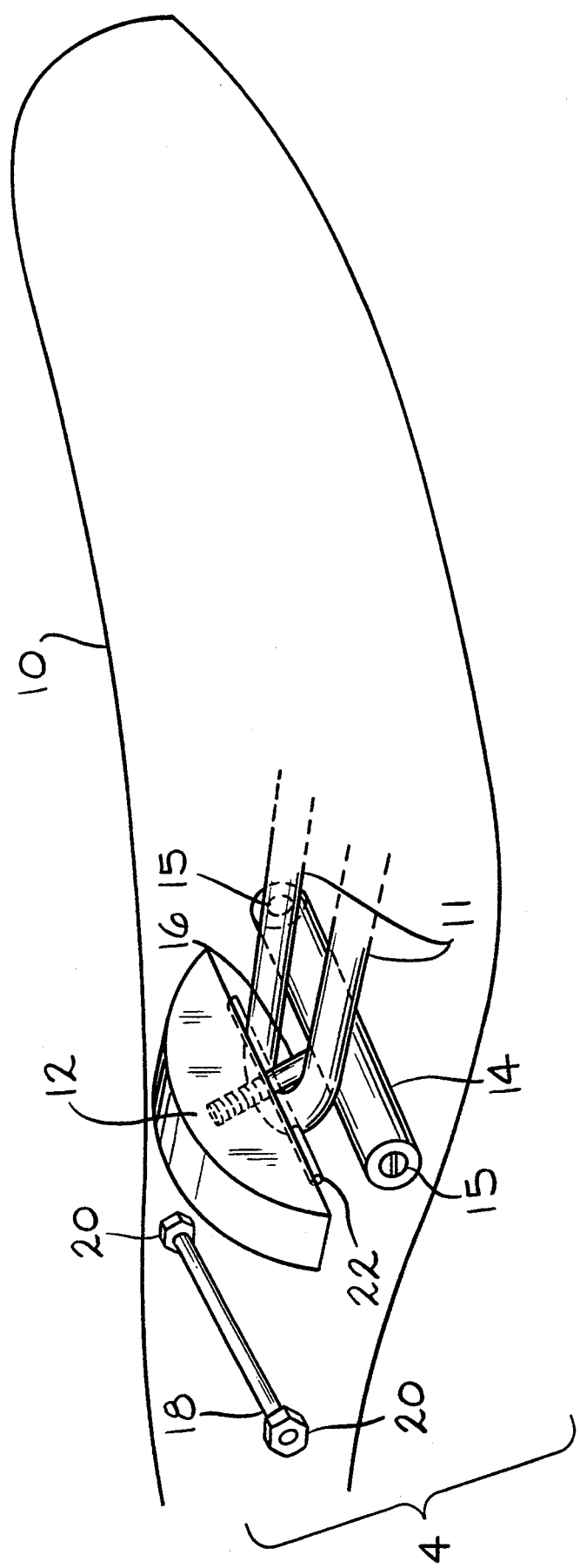
FIG. 2 is a perspective view of all the components with the saddle in the forward position.

When the saddle 10 is in its forward position, as shown in FIG. 2, the rails 11 are disengaged altogether from saddle nose pin 18. The saddle nose pin 18 is affixed to the saddle 10 by threaded nose pin nuts 20 or other suitable affixing means. A rails nose bumper 22 is installed through the rails 11 in a transverse direction to the longitudinal axis of the rails 11, either end of said rails nose bumper 22 coming to extreme close proximity to respective inside surfaces under the nose of the saddle 10 for purposes of centering the rails 11 with respect to the saddle 10, when the saddle 10 is in its rearward position.

Figure 3:
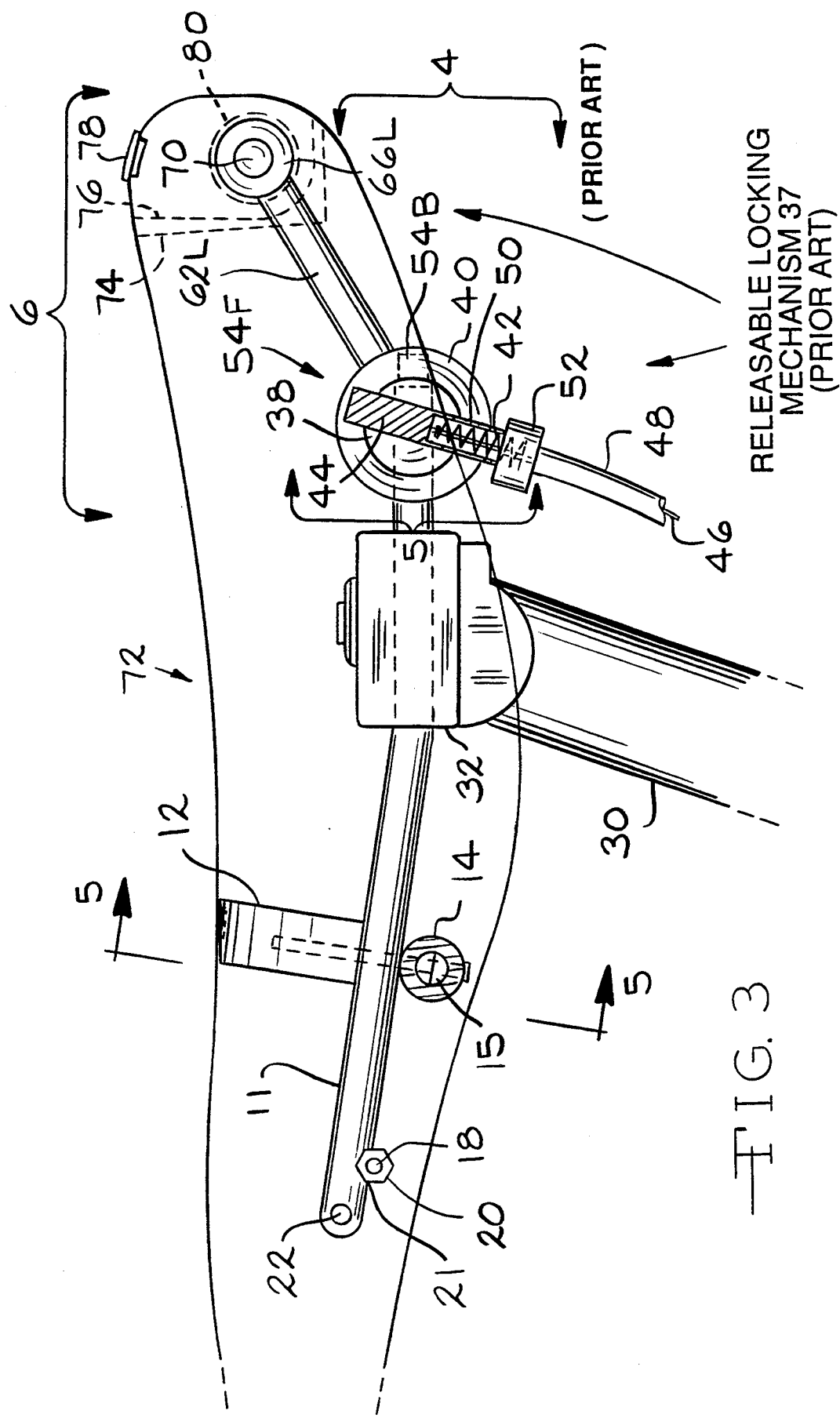
FIG. 3 is a side elevational view with the saddle in the rear positon with the prior art actuating control and releasable locking mechanism structure utilized therewith.
Figure 10:
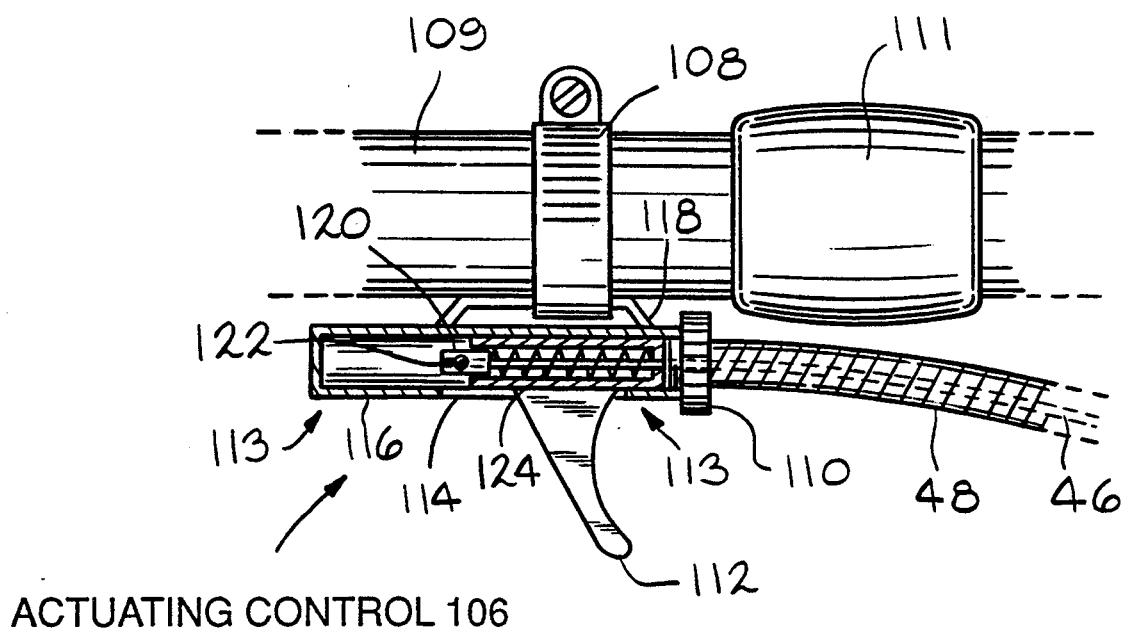
FIG. 10 is a side view of the prior art actuating control mechanism assembly utilized with this improvement invention as shown and described in U.S. Pat. No. 5,048,891.

The rails rest 12 provides for a sturdy no-moving-parts slidable support for the saddle 10 onto the rails 11. The rails retainer 14 provides for retaining the rails 11 in a desirable proximate position to the rails rest 12 which prevents the rails rest 12, and in turn the saddle forward portion, from being raised off of the rails 11, particularly when the saddle 10 is in its forward positon, when then the rails 11 are not in a bearing position against the saddle nose pin 18. When the saddle is in its rear position, as shown in FIGS. 1 and 3, the saddle nose pin comes to bear against the rails notch 21 which provides additional retainage against saddle 10 uplift off of the rails 11 in which rear position the saddle 10 is most likely to be subjected to excessive uplift forces, such as when pulling up on the saddle for height increase adjustment, pounding upwards under the saddle nose for angulation adjustment, or when lifting the bicycle by the nose of the saddle 10. The rails guide screw 16 can be tightened to decrease the space between the rails rest 12 and rails retainer 14 as the rails rest 12 is bearing surface wears. The holes through the saddle 10 which permit pass-through of the rails retainer screws 15 can be made large enough to permit this adjustment with their lowering and tightening concurent with the rails guide screw 16 adjustment. When the saddle 10 is in its forward position, when the forward most juncture of the rails 11 come near to bear on the rails guide screw 16, the rails guide screw 16 then serves to center the rails 11 relative to the saddle 10 to prevent sidewards sloppy play of the saddle 10.

The rails nose bumper 22 provides for anti-sidewards sloppy play of the saddle 10 relative to the rails 11 when the saddle 10 is in its rearward position, best shown in FIG. 1, by either end of the rails nose bumper 22 coming near to bear, or even to slightly bear, on their respective sides of the narrowed portion of the under-side nose portion of the saddle 10. When the saddle 10 is in its forward position, FIG. 2, the rails nose bumper 22 is not in contact with the saddle 10 because the saddle 10 is much wider at that point, and the centering function is assumed by the rails guide screw 16 as aforementioned.

The prior art actuating controls and prior art releasable locking mechanism and associated operative structure used in association with the improvement invention are shown and described in a portion of FIG. 3 and FIGS. 6 through 10. For purposes of clarity, the numerical designations for component parts of the prior art structures shown in the drawings are the same as the numerical designations thereof utilized in U.S. Pat. No. 5,048,891. The written descriptions pertaining thereto as contained in U.S. Pat. No. 5,048,891 are incorporated herein by references thereto. This incorporation by reference extends to any alternate structure pertaining to the foregoing prior art structures utilized herein which are shown in the pertinent drawings and written descriptions as contained in U.S. Pat. No. 5,048,891.

CONCLUSION, RAMIFICATIONS AND SCOPE OF INVENTION

Thus, it can be seen that these improvements are significant and manifold. Other embodiments and/or improvements are possible, such as: the rails nose bumper can be a smooth dowel press fit through the rails, threaded to screw through the rails. A molded piece could be constructed to slip over the rails, the saddle could be molded to touchingly engage mated receiving side portions of the rails, etc. A vertical receiving slot could be cut into the extreme forward portion of the rails and engage a vertical post attached to the underside of the saddle from the saddle nose pin for centering purposes.

The rails retainer could be attached to thickened portions of the saddle where its ends come to bear to allow for flush countersunk screw installation. The saddle could be molded with receiving slots or cavities into which the rails retainer ends could be slipped by spreading the saddle wider, possibly eliminating the need for the rails retainer screws. The rails rest could be partially molded with the saddle and configured to receive a replaceable bearing surface cap. The rails notch could be possibly eliminated, particularly if a single fore/aft angle geometry embodiment is produced as opposed to a model offering different geometry options as the present prototype does (by substituting differect slot and hole configurations in the "Drum", which is described in the U.S. issued patent). The bottom surface of the rails rest could be curved or differently shaped to facilitate wear reduction, smoothness in operation, or accomodation of different saddle movement geometries. A member could be installed between the rails with a slot or opening for keeping the rails centered relative to the saddle throughout the entire saddle movement range, not only near the range extremes as it now does.

The forward portion of the rails could be bent or deformed to different shapes to alter saddle geometry. The relative sizes of the improvement components can be changed as well as shaped differently to fine tune for desired effects, etc. Alternate methods of attachment, adjustability, and intercomponent working relationships are possible for achieving new and desirable effects. The components can be hollow, solid and of varying materials, etc. Thus, many variations are possible and the scope of this invention, therefore, should be determined not by the specifications illustrated but by the appended claims and their equvalents.

In summary, an adjustable cycle saddle seat assembly is provided which is adapted for selective mounting on a cycle seat support post and having an in situ operator controlled seat position changing apparatus integrally provided therein. The combination includes a saddle seat. A longitudinally extending rail assembly is provided within the saddle seat. The rail assembly has a saddle nose pin engaging rail notch provided in the rail assembly. A rail retainer member is provided in the saddle seat in operative sliding engagement with the rail assembly. A rail assembly support rest member is affixed to the saddle seat. The rail assembly support rest member is threadably connected to the rail retainer by a rail guide screw member which is provided through the rail retainer member. The rail retainer member and the rail assembly support rest member cooperate to operatively slidably engage the rail assembly therebetween. A transversely positioned saddle nose pin is fixedly provided in the saddle. The saddle nose pin is adapted to selectively engage the rail member notch when the saddle seat is in its saddle rear position. A rails assembly nose bumper is fixedly provided in the saddle rail assembly. The rails nose bumper is adapted to engage the inside surfaces of the saddle seat assembly so as to selectively center the rail assembly when the saddle seat is in its rearward position. An operator controlled actuating means is provided operative engagement with the rail assembly so as to selectively change the relative position of the saddle seat to its respective forward and rear positions on the rail assembly.

The longitudinally extending rail assembly consists of an elongate substantially U-shaped rail member which has a forward closed U-portion and rear open end portions which are adapted to operatively engage the operator controlled actuating means.

Various other modifications of the invention may be made without departing from the principle thereof. Each of the modifications is to be considered as included in the hereinafter appended claims, unless these claims by their language expressly provide otherwise.

I claim:

1. In an adjustable cycle saddle seat assembly adapted for selective mounting on a cycle seat support post and having an in situ operator controlled seat position changing apparatus integrally provided therein, the combination including a saddle seat, said saddle seat having rails assembly nose bumper engaging inside surfaces;

a longitudinally extending rail assembly provided within said saddle seat, said rail assembly having a saddle nose pin engaging rail notch provided in said rail assembly;

a rail retainer member (14) provided in said saddle seat in operative sliding engagement with said rail assembly;

a rail assembly support rest member (12) affixed to said saddle seat, said rail assembly support rest member threadably connected to said rail retainer by a rail guide screw member provided through said rail retainer member, said rail retainer member and said rail assembly support rest member cooperating to operatively slidably engage said rail assembly therebetween;

a transversely positioned saddle nose pin (18) fixedly provided in said saddle seat, said saddle nose pin adapted to selectively engage said rail notch when said saddle seat is in its saddle rear position;

a rails assembly nose bumper fixedly provided in said rail assembly, said rails assembly nose bumper adapted to engage said nose bumper engaging inside surfaces of said saddle assembly so as to selectively center said rail assembly when said saddle seat is in its rearward position; and operator controlled actuating means in operative engagement with said rail assembly so as to selectively change the relative position of said saddle seat to its respective forward and rear positions on said rails assembly.

2. In the adjustable cycle saddle seat assembly of claim 1 wherein said longitudinally extending rail assembly consists of an elongate substantially U-shaped rail member having a forward closed U-shaped portion and rear open end portions, said open end portions adapted to operatively engage said operator controlled actuating means.

3. In the adjustable cycle seat assembly of claim 1 wherein said rail assembly support rest member is fixedly attached to said saddle seat so as to rigidly move correspondingly therewith, said rail assembly support rest member having a substantially horizontal bottom surface for bearing on said rail assembly.

4. In the adjustable cycle saddle seat assembly of claim 1 wherein said rail retainer member is positioned transverse to the longitudinal axis of the saddle seat, said rail retainer positioned in close proximity below said rails assembly.

5. In the adjustable cycle saddle seat assembly of claim 1 wherein said rail assembly support rest member is provided with a vertical threaded bore so as to adjustably receive said rail guide screw member provided through said rail retainer member so as to selectively adjust the distance between the transversely situated rails retainer member and said rail assembly member while retaining said rail assembly therebetween, said rail guide screw member adapted to cooperate with said rail assembly to center said saddle seat assembly in its forward rest position.

6. In the adjustable cycle saddle seat assembly of claim 1 wherein said saddle nose pin is positioned transversely to the longitudinal axis of the saddle seat so as to be located below said rails assembly, said saddle nose pin being in close proximity to said rails assembly when the saddle seat is in its rear rest position.

7. In the adjustable cycle saddle seat assembly of claim 1 wherein said rails assembly nose bumper is transversely positioned at the forward portion of said rails assembly so as to center the rails assembly relative to the saddle seat when said saddle seat is in its rear rest position.

8. In the adjustable cycle saddle seat assembly of claim 1 wherein said rails assembly nose bumper is transversely provided through the forward portion of said rails assembly so as to engage said nose bumper engaging inside surfaces of the nose portion of said saddle seat assembly so as to center said rails relative to said saddle seat when said saddle seat is in its rear rest position.

* * * * *